United States Patent
Schwanke et al.

(10) Patent No.: US 8,128,885 B2
(45) Date of Patent: *Mar. 6, 2012

(54) MICROREACTOR AND METHOD FOR MANUFACTURING SAME AND METHOD FOR MANUFACTURING A SUBSTRATE FOR A MICROREACTOR

(75) Inventors: Dieter Schwanke, Hof (DE); Mirco Harnack, Berg (DE); Achim Bittner, Burgkundstadt (DE); Ulrich Schmid, Vienna (AT)

(73) Assignee: Micro Systems Engineering GmbH (DE)

( * ) Notice: Subject to any disclaimer, the term of this patent is extended or adjusted under 35 U.S.C. 154(b) by 520 days.

This patent is subject to a terminal disclaimer.

(21) Appl. No.: 12/210,323

(22) Filed: Sep. 15, 2008

(65) Prior Publication Data

US 2009/0098030 A1 Apr. 16, 2009

(30) Foreign Application Priority Data

Oct. 13, 2007 (DE) .......................... 10 2007 049 172

(51) Int. Cl.
*B01J 8/02* (2006.01)
*B01J 35/02* (2006.01)
*B01J 15/00* (2006.01)
*B01J 16/00* (2006.01)
*B01J 19/00* (2006.01)

(52) U.S. Cl. ........ 422/211; 422/129; 422/130; 422/600; 422/603

(58) Field of Classification Search .................. 422/129, 422/130, 211, 600, 603
See application file for complete search history.

(56) References Cited

U.S. PATENT DOCUMENTS

| | | | |
|---|---|---|---|
| 4,867,935 | A | 9/1989 | Morrison, Jr. |
| 5,089,071 | A | 2/1992 | Tominaga et al. |
| 5,100,714 | A | 3/1992 | Zsamboky |
| 5,108,958 | A | 4/1992 | Moh et al. |

(Continued)

FOREIGN PATENT DOCUMENTS

DE 33 32 029 A1 3/1984

(Continued)

OTHER PUBLICATIONS

Bittner A., Schmid U.: "The porosification of fired LTCC substrates by applying a wet chemical procedure," *Journal of the European Ceramic Society*, Bd. 29, Jul. 7, 2008, pp. 99-104, XP002565823.

*Primary Examiner* — Walter D Griffin
*Assistant Examiner* — Natasha Young
(74) *Attorney, Agent, or Firm* — Craig A. Fieschko, Esq.; DeWitt Ross & Stevens S.C.

(57) ABSTRACT

The invention relates to a microreactor having a substrate (10, 20, 80) with at least one catalytically active material arranged in and/or on a cavity structure (14, 24, 84). The substrate (10, 20, 80) has a first layer (11, 21, 80) and optionally at least one additional layer (12, 22) of a ceramic material, with the first layer (11, 21, 80) being formed from a first component of a crystalline ceramic material and/or a glass material as the matrix and a second component of an additional crystalline ceramic material. The surface areas of the crystals and/or crystal agglomerates of the second component in the first layer (11, 21, 80) are etched out in at least some areas to form the cavity structure (14, 24, 84).

35 Claims, 2 Drawing Sheets

U.S. PATENT DOCUMENTS

| | | | | |
|---|---|---|---|---|
| 5,130,067 A | * | 7/1992 | Flaitz et al. | 264/669 |
| 5,204,289 A | * | 4/1993 | Moh | 501/5 |
| 5,498,580 A | * | 3/1996 | Yamade et al. | 501/9 |
| 5,674,301 A | | 10/1997 | Sakai et al. | |
| 5,859,614 A | | 1/1999 | Paolella et al. | |
| 5,993,750 A | | 11/1999 | Ghosh et al. | |
| 6,540,975 B2 | | 4/2003 | Tonkovich et al. | |
| 6,616,909 B1 | | 9/2003 | Tonkovich et al. | |
| 6,936,237 B2 | | 8/2005 | Wang et al. | |
| 7,288,231 B2 | | 10/2007 | Tonkovich et al. | |
| 2004/0239006 A1 | * | 12/2004 | Hong | 264/400 |
| 2005/0136565 A1 | * | 6/2005 | Huff | 438/52 |
| 2006/0046113 A1 | * | 3/2006 | Wang et al. | 429/20 |
| 2006/0254315 A1 | * | 11/2006 | Winkler et al. | 65/21.4 |
| 2007/0034910 A1 | | 2/2007 | Shie | |
| 2007/0053158 A1 | * | 3/2007 | Pleskach et al. | 361/689 |
| 2007/0142530 A1 | * | 6/2007 | Kajimura et al. | 524/430 |
| 2007/0154367 A1 | * | 7/2007 | Jang et al. | 422/189 |
| 2008/0286554 A1 | | 11/2008 | Schwanke et al. | |
| 2009/0098030 A1 | | 4/2009 | Schwanke et al. | |
| 2009/0176345 A1 | * | 7/2009 | Saita et al. | 438/381 |
| 2010/0255261 A1 | | 10/2010 | Schwanke et al. | |

FOREIGN PATENT DOCUMENTS

| | | | |
|---|---|---|---|
| DE | 42 34 349 A1 | | 4/1993 |
| DE | 100 43 194 A1 | | 9/2000 |
| DE | 100 35 623 A1 | | 2/2002 |
| DE | 100 42 653 A1 | | 3/2002 |
| DE | 103 13 685 A1 | | 10/2003 |
| DE | 102 45 848 A1 | | 4/2004 |
| DE | 10 2005 004 075 A1 | | 8/2006 |
| EP | 0 188 065 A | | 7/1986 |
| EP | 10 2007 020 888 A1 | | 7/1986 |
| EP | 0 234 896 A2 | | 2/1987 |
| EP | 08 70 541 A2 | | 10/1998 |
| EP | 1 314 472 A1 | | 5/2003 |
| EP | 1 990 331 A | | 11/2008 |
| EP | 2 055 374 A | | 5/2009 |
| GB | 2 266 181 A | | 3/1993 |
| WO | WO 00/06295 A1 | | 2/2000 |
| WO | WO 02/09232 A1 | | 1/2002 |
| WO | WO 01/12312 A2 | | 5/2002 |
| WO | WO 2007/013604 A1 | * | 2/2007 |

* cited by examiner

MICROREACTOR AND METHOD FOR MANUFACTURING SAME AND METHOD FOR MANUFACTURING A SUBSTRATE FOR A MICROREACTOR

FIELD OF THE INVENTION

The invention relates to a microreactor having a substrate with a cavity structure and at least one catalytically active material arranged in and/or on the cavity structure. The invention also relates to a method for manufacturing such a microreactor and a method for manufacturing a substrate for a microreactor.

BACKGROUND OF THE INVENTION

A microreactor is a miniaturized reaction system for process engineering and chemical engineering. Such microreactors are provided with fluid channels, reaction chambers, reaction spaces, heating devices, mixing devices or the like, for example, and several such elements may also be combined to form a microreactor system. Such a microreactor may be used, for example, for individual operations such as performing chemical, biochemical and physicochemical reactions, distillation, mixing, separating, etc., or for an entire chain of such operations.

Such a microreactor for chemical, biochemical or physicochemical reactions usually has one or more inlets or feeder lines and one or more outlets or outlet lines for the product(s) (reaction product) formed from the reactants, such that between them there is at least one reaction space or reaction chamber, in which the at least one reactant is converted into the product(s). Catalysts or catalytically active elements are often used with such reactions, specifically accelerating the particular reaction without being converted themselves, by lowering the activation energy.

The catalytic reactions performed in such a reactor include, for example, steam reforming, $CO_2$ reforming, (partial) oxidation, chlorination, fluorination, hydrogenation, dehydrogenation, nitration, CO conversion, reverse reaction of CO conversion, autothermal reforming, incineration, hydrocracking, reduction, partial reduction and hydrodesulfurization.

Microreactors with the largest possible specific surface area are useful in particular for catalytic reactions between fluids (reactions between gases and/or liquids) to achieve a high reaction rate with the lowest possible use of the reactants as materials.

The document DE 103 13 685 A1 discloses a microreactor comprising several individual layers combined to form a stack of layers. The stack of layers here has at least one cover layer and at least one channel layer, such that on one side the channel layer is provided with microstructures, which together with the facing side of the neighboring cover layer, form microchannels. The microstructured layer may be manufactured here from a metal foil, for example, a copper foil, aluminum foil or stainless steel foil, or manufactured from a plastic film, a ceramic film or other materials. The microstructures can be produced by etching, whereby a semi-elliptical cross section of the individual microstructures is obtained by the etching process. Embossing is mentioned in this document as an alternative to etching to produce the microstructures, allowing lower machining costs in comparison with etching. The microchannels formed by a channel layer and a cover layer have a width in the range of 400 µm, a depth of 200 µm and a length of 8 mm to 20 mm. The disadvantage of such a microreactor is that the ratio of available reaction surface area is low in relation to the volume of the microreactor, so the microreactor must be constructed to be comparatively large on the whole in order to provide the desired specific surface area.

Document EP 1 206 316 B1 discloses a chemical reactor for a catalytic reaction having at least one gaseous reactant. The reactor has a porous structure, which is arranged in such a way that the flow path of the reactant runs along a microchannel and in contact with the porous material. A portion of the at least one reactant diffuses in a transverse molecular pattern into the porous structure to which a catalytically active material can be applied, and it reacts to form at least one product that diffuses transversely back into the flow path. The porous material may comprise a catalytically active material, e.g., a catalytic ceramic or a catalytic metal in the form of a foam or felt. Alternatively, the porous material may comprise a porous carrier of a noncatalytic material (e.g., a ceramic foam), whereby a catalytically active material is arranged on this support. The porosity may be designed as a geometrically regular pore structure, e.g., a honeycomb structure or a structure comprising parallel pores, or may be designed as a geometrically coiled or random structure. According to the specifications in the document, the degree of porosity may be approx. 30%, for example, up to approx. 98%, whereby the average pore size is smaller than the smallest dimensions of the microchannels. The pore size is approx. 0.1 µm to approx. 200 µm, thus allowing molecular diffusion.

The documents U.S. Pat. No. 5,674,301 and WO 00/06295 A1 also describe microreactors in which a catalyst is arranged on a carrier having pores or porous structures. The document U.S. Pat. No. 5,674,301 discloses a porous substrate with which a catalyst is provided in the pores for reforming hydrocarbon. Document WO 00/06295 A1 describes a reactor device having a reaction chamber, whereby a porous insert through which essentially all the reactants must pass is provided in the volume of the reaction chamber. The porous insert has an average porosity of less than 1 and has a transport distance of no more than 3 mm. The porous insert here may comprise a powder, a porous monolithic material (e.g., an expanded metal or a ceramic foam), a honeycomb structure, a tube row, a module with microchannels stacked one above the other or a combination of these structures), or fibers. For catalytic reactions, the porous insert may comprise a porous carrier with a catalyst material arranged on it.

The disadvantage of these known microreactors is that the catalytically active material is applied to the porous surface area so that the surface area available for reaction of the reactants with the catalytically active material is greatly limited. Therefore, the large surface area available through the porosity is thus not utilized. Furthermore, the document EP 1 206 316 B1 describes an expanded ceramic material as a substrate comprising in its totality a porous structure. The areas of the porous structure can be determined only by the external dimensions.

SUMMARY OF THE INVENTION

The object of the present invention is thus to create a microreactor with which a catalytically active material having a large specific surface area is made available, in particular for use as a gas reactor, to achieve a high reaction rate while using a small amount of material. The object is also to provide a simple and inexpensive method for manufacturing a substrate for such a microreactor and/or for production of such a microreactor.

The object defined above is achieved by a microreactor in which the substrate has a first layer and optionally at least one additional layer comprised of a ceramic material, such that the first layer contains at least one first component of a crystalline ceramic material and/or a glass material as the matrix and contains a second component of an additional crystalline ceramic material. The cavity structure is formed by the fact that surface areas of the crystals and/or crystal agglomerates of the second component in the first layer are removed by etching in at least some areas.

The inventive microreactor has the advantage that the cavity structure is a continuous structure due to its production method using etching (in contrast with open or closed porosity in ceramics formed by sintering) and its structure depends on the structure and/or spatial form in which the surface areas of the second component are present. The surface areas are preferably formed from one or more transitional phases or intermediate phases. The transitional phases and intermediate phases preferably have a slightly altered structure in comparison with the structure and/or composition of the second crystalline component, whereby the slightly altered structure may have crystalline and amorphous components and/or a slightly altered composition. The surface areas may also have components of the matrix (first component) in their composition. The composition and/or structure of the surface areas may vary over a certain range. The surface area of a crystal or crystal agglomerate composed of multiple crystals thus comprises the grain boundary area of the respective crystal or crystal conglomerate, but it may also extend into the crystal with the stoichiometric composition of the second component.

A further advantage of the inventive microreactor is that, through a suitable choice of the etching parameters, the porous structure may be limited to an area intended for the respective application. Likewise due to the fact that the substrate is initially porosized in the manner described herein and then is provided with a catalytically active material by coating, this can be optimally adapted in its extent and layer thickness to the respective application of the microreactor.

In a preferred exemplary embodiment, the etched cavity structure (porosized region) lies only in a predetermined area of the first layer and extends down to a predetermined depth of the first layer. The extent of the etched surface areas of the second component, i.e., the depth of the porosized region, is also controlled by the process parameters, the type of etching medium, the temperature, the concentration of the etchant and the etchant exposure time. For example, a cavity structure depth of 20 μm can be achieved by using an etchant based on phosphoric acid with a process time of six hours.

The etching step is also referred to as porosization or a porosizing process.

In addition to simple process control, another advantage of this wet chemical etching process lies in particular in the development of a cavity structure having interconnected cavity structures, because the surface areas of the crystals and/or crystal agglomerates interconnect the crystals and crystal agglomerates of the second component which are side-by-side, so the etchant penetrates into the etched area along the surface areas during the etching process. It is useful here for the etching behavior of the surface areas of the crystals and crystal agglomerates of the second component to differ from the etching behavior of the first component forming the matrix, so the surface areas can be etched out selectively.

The advantage of the inventive microreactor in comparison with the traditional microreactors lies in an increase in the active surface area due to a very simple etching process, creating the advantageous cavity structures, preferably designed as a pore structure or a tubular structure. Due to the miniaturized design of the microreactor, concentration gradients and temperature gradients can be reduced, so that uniform boundary conditions can be ensured during and between test runs. Due to the compact design of the microreactor, it is also possible to perform model reactions at high pressures and/or high temperatures with defined flow conditions (usually laminar). When a glass ceramic is used as the substrate material, it additionally contributes toward a reduction in concentration gradient and temperature gradient due to its low thermal conductivity (approx. 3 W/mK) in comparison with silicon (approx. 150 W/mK).

In an especially preferred exemplary embodiment, the at least one catalytically active material is applied in or to the cavity structure by vapor phase deposition, in particular by CVD (chemical vapor deposition) or PVD (physical vapor deposition). By means of these methods, which can be controlled well technically, homogeneous coverage of the catalytically active material in or on the cavity structure is achieved. As explained above, the cavity structure is continuous so the coating also reaches deeper areas of the structure, thereby fully utilizing the large surface area of the structure in comparison with the traditional pore structures and is completely available for the reaction of the reactant when coated with the catalytically active material.

Especially preferred catalytically active materials contain at least one element or one compound selected from the group comprising platinum, palladium, nickel and rhodium.

In a preferred exemplary embodiment, the inventive microreactor has as the second component $Al_2O_3$ crystallites and/or an aluminum-based crystalline compound and/or an aluminum oxide-based crystalline compound different from $Al_2O_3$, preferably with a total amount of max. 40 vol % in the matrix, containing preferably silicon and/or lead in the surface areas of the crystals and/or crystal agglomerates. These can also be etched easily.

A microreactor in which the substrate has at least one second layer is of particular advantage, whereby the first layer and at least one second layer are produced by means of LTCC technology ("low-temperature co-fired ceramics technology"). LTCC technology is a technology that is generally used to manufacture microelectronic substrates with a high coverage. The LTCC technology generally uses sintered ceramic carriers. Printed conductors, capacitors, resistors and coils or other elements can be produced in or on these ceramic carriers. These elements are applied to the respective unfired layer by screen printing or photochemical processes. The unfired ceramic films are structured individually and then stacked and laminated. Next, a defined sintering profile with a peak temperature of approx. 850° C. to 900° C. is used to strengthen the structure. By using the LTCC technology to manufacture the microreactor substrate, it is possible to implement a microfluidic system having channel structures and integrated sensor elements or heating elements in a particularly simple manner. Furthermore, LTCC ceramics are resistant to many commonly used chemicals (except, for example, hydrofluoric acid, KOH or phosphoric acid-based etching mixtures).

The first layer and/or the at least one second layer of the substrate especially preferably has a heating element which is preferably arranged above or below the cavity structure provided in the first layer. Such a heating element may be integrated especially easily into an LTCC ceramic in the manner described below. It contributes toward further miniaturization of the microreactor because no other heating elements, optionally surrounding the microreactor on the outside, need be used to adjust the desired reaction temperature.

The microreactor has an especially simple design when the substrate with the cavity structure has at least one section of a wall of a reaction space of the microreactor in which the conversion of at least one reactant into at least one product takes place, such that the region having the cavity structure is arranged so that the at least one reactant flows past the area having the cavity structure. A simple reaction of the at least one reactant with the catalyst is achieved in this way and can be controlled through the flow rate.

In an alternative exemplary embodiment of the inventive microreactor, the substrate comprises only the first layer, and the cavity structure extends over the entire thickness of the substrate in a predefined area. The substrate is arranged in the reaction space in such a way that the reactant is passed through the cavity structure. This may be accomplished, for example, by arranging the substrate perpendicular to the direction of flow and forcing the entire media flow to pass through the substrate designed as a membrane. In this way, an increased conversion rate is achieved, but throttling of the system, which may have a negative effect, may have to be accepted.

To achieve better control of the reaction(s) performed in the inventive microreactor, at least one sensor element, preferably for measuring the flow rate, is arranged in a channel or the reaction space upstream from the section of the substrate having the cavity structure in or on a carrier or the substrate in the direction of flow of the reactant. Alternatively or additionally, at least one sensor element, preferably a chemical sensor for measuring the quality of the conversion process, is provided in a channel or the reaction space in the direction of flow of the reactant downstream from the section of the substrate having the cavity structure in or on a carrier or the substrate. These sensor elements may be connected to the control unit which monitors and controls the reaction process and collects and analyzes the values transmitted by the sensor elements for this purpose.

The object defined above is also achieved by a method for manufacturing a substrate for a microreactor, such that first the substrate with a first layer and optionally at least one additional layer is made available, such that the first layer, comprising at least one first component of a crystalline ceramic material and/or a glass material as the matrix and a second component of an additional crystalline ceramic material which is present in the matrix, then in a predefined area of the first layer, surface areas of the crystals and/or crystal agglomerates of the second component are etched selectively to create a cavity structure in the first layer, and finally a catalytically active material is applied to and/or introduced onto and/or into the cavity structure.

This method is very simple and inexpensive and allows the production of a substrate having a cavity structure for an inventive microreactor as defined above with the advantages mentioned above. In addition, the manufacturing process can be controlled easily, preferably by performing the etching step, preferably by means of a suitable mask, in a predetermined area of the first layer and/or down to a predetermined depth of the first layer to create a cavity structure in the first layer merely in the predetermined area and/or down to the predetermined depth of the first layer. The etching step here may be controlled by using a specific etchant and/or by appropriate control of the etching time and etching temperature. Transitional phases or intermediate phases of the second component are preferably etched in the surface area of the crystals and/or the crystal agglomerates of the second component.

The inventive method for manufacturing the substrate is especially simple and inexpensive to implement as well as being technically very controllable if a vapor phase deposition method is used, preferably a CVD method or PVD method, for applying or introducing the catalytically active material into and/or onto the substrate.

The cavity structure formed by porosizing is preferably designed as a pore structure or tubular structure.

It is also advantageous if the matrix and the second component form a glass ceramic material before the etching step. This facilitates etching, and the substrate manufactured from this material also benefits and therefore, as explained above, the microreactor benefits from the low thermal conductivity of the glass material. Furthermore, the material can be controlled well with regard to the required crystal size and crystal distribution of the second component and the surface areas of the crystals and crystal agglomerates in the second layer and thus with respect to the subsequent development of the porosized cavity structure. The glass ceramic material can also be processed very easily by LTCC technology. The corresponding films (tapes) are available commercially.

As explained above, it is advantageous if the second component contains $Al_2O_3$ crystallites and/or has an aluminum-based crystalline compound different from $Al_2O_3$ and/or has a crystal compound based on aluminum oxide.

The etching step especially preferably includes a wet chemical etching step, preferably using a phosphoric acid-based etchant, because such an etching process is often easy to perform.

It has already been explained above that there are a number of advantages to using a substrate material having at least two layers, whereby the at least two layers are first produced as LTCC and then the cavity structure is created in the first layer.

It is also especially preferable for a heating element to be introduced above or below the area having the cavity structure in and/or on the first layer and/or in or on the at least one additional layer. In an especially preferred exemplary embodiment, the heating element here may be manufactured by means of the thick film technology as part of the LTCC process in the second layer arranged above or below the first layer and it is brought in contact by means of vias.

For manufacturing a substrate membrane, which is to be arranged, e.g., perpendicular to the direction of flow of the at least one reactant in the microreactor, in a preferred manufacturing method for the substrate, only a first layer is provided, and in a certain area of the first layer, the cavity structure is created over the entire thickness of the substrate by etching the surface areas of the crystals and/or crystal agglomerates of the second component. The thickness of the substrate is understood to refer to the extent of the substrate running parallel to the direction of flow of the at least one substrate in the arrangement of the substrate in the reaction space. The at least one reactant therefore passes through the cavity structure essentially in the direction of the thickness of the substrate.

In addition, an especially preferred manufacturing method includes the step in which a sensor element is arranged upstream from the section of the substrate having the cavity structure, preferably for measuring the velocity of flow, in or on the substrate in the direction of flow of the at least one reactant. Alternatively or additionally, at least one sensor element, preferably a chemical sensor for measuring the conversion process, may be arranged in the substrate downstream from the section having the cavity structure in the direction of flow of a reactant in or on the substrate. The sensors may be integrated monolithically into the substrate, e.g., as a heated thin-film resistor in the case of measurement of the velocity of flow, or it is possible to use suitable prefabricated sensors, which are connected to the substrate optionally at a certain predetermined depth of the substrate.

The object described above is also achieved by a method for manufacturing a microreactor in which first at least one inventive substrate is manufactured according to an inventive method as described above and then the at least one substrate is arranged in such a way that it forms a section of the wall of a reaction space, so that at least one reactant flows by the cavity structure.

Likewise, the object defined above is achieved by a method for manufacturing a microreactor, wherein a substrate comprising only the first layer and a cavity structure extending over the entire thickness in a predefined area is produced and then the substrate is arranged in the reaction space in such a way that the reactant flows through the cavity structure.

Both of these inventive methods for manufacturing microreactors can be implemented easily and require only correct alignment of the substrate or the substrates in the reaction space.

Additional goals, features, advantages and possible applications of the invention are derived from the following description of an exemplary embodiment on the basis of figures. All the features described and illustrated here in the drawings constitute the subject matter of the present invention, either individually or in any combination, regardless of how they are combined in the individual claims or their reference back to preceding claims.

DETAILED DESCRIPTION OF PREFERRED VERSIONS OF THE INVENTION

Figure 1:
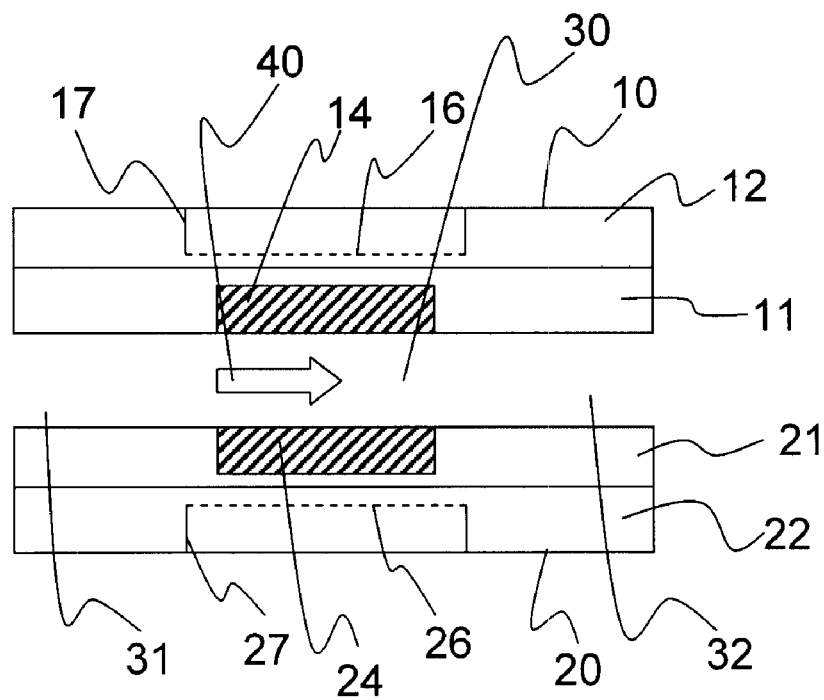
FIG. 1 a cross section through a first exemplary embodiment of an inventive microreactor, FIG. 2 a cross section through a second exemplary embodiment of an inventive microreactor and FIG. 3 a cross section through a third exemplary embodiment of an inventive microreactor.

FIG. 1 shows a section through an inventive microreactor, in which a reaction space 30 is formed by a first substrate 10 and a second substrate 20. The first substrate 10 has a first layer 11 and a second layer 12 arranged one above the other. The first substrate 10 is designed here as an essentially plate-shaped element. By analogy with the first substrate 10, the second plate-shaped substrate 20 also comprises a first layer 21 and a second layer 22, which are also arranged one above the other. The first layers 11, 21 of the substrates 10, 20 are arranged adjacent to the reaction space 30.

The first layer 11 has porosized area 14, in which a cavity structure is produced by porosizing. Another porosized area 24 opposite the porosized area 14 of the first layer 11 is arranged in the first layer 21 of the second substrate 20. The reaction space 30 is formed in particular between the two porosized areas 14, 24 of the substrates 10, 20.

The first layers 11, 21 and the second layers 12, 22 preferably comprise a sintered glass ceramic, e.g., an LTCC tape having the composition comprising 30% $SiO_2$, 40% $Al_2O_3$, 4% CaO, 9% PbO, 2% $B_2O_3$+remainder (known by the product designation DP951); the composition comprising 30% $SiO_2$, 20% $Al_2O_3$, 3% CaO, 5% SrO, 17% BaO, 5% ZnO+ remainder (known as "Heraeus tape"), or the composition comprising approx. 50% $Al_2O_3$, approx. 15% $B_2O_3$, approx. 15% $La_2O_3$, +remainder (known by the product designation DP943), all from the company Heraeus (Hanau, Del.), whereby the first layers 11, 21 may differ slightly in their composition from the second layers 12, 22. This substrate material with the respective first layer 11, 21 is placed in a suitable etching solution (e.g., phosphoric acid for DP951, Heraeus tape and DP943) for porosizing at a temperature of 110° C. Alternatively, the porosizing process may also be performed with KOH (potassium hydroxide) in a concentration of approx. 40% at a temperature in the range of 80° C. The etching depth, i.e., the depth of the porosized region 14, 24 in the respective first layer 11, 21, depends on the type of etching medium, the selected etching temperature and the etching time. When phosphoric acid is used as the etchant for the glass ceramic DP951, for example, a depth of penetration of 15 μm is reached at an etching temperature of 110° C. and an etching time of 4 hours. The respective porosized regions 14, 24 have a large surface area due to the cavity structure achieved by the porosizing process.

The cavity structure present in the porosized regions 14, 24 is then coated with a catalytically active material, which is preferably deposited from the vapor phase (e.g., via a CVD process or a PVD process) to achieve homogeneous coverage of the pores and gaps. For example, platinum, palladium or nickel may be used here as catalytically active materials.

After coating, the substrates 10, 20 are inserted into the desired areas of the microreactor, e.g., as shown in FIG. 1, and secured there.

The exemplary embodiment of an inventive microreactor illustrated in FIG. 1 forms a microchannel with an inlet 31 and an outlet 32 and the reaction space between the inlet 31 and the outlet 32 arranged between the first substrate 10 and the second substrate 20. The at least one fluidic reactant goes through the inlet 31 into the reaction space 30 where the desired reaction takes place by means of the catalytically active material (catalyst). One possible reaction would be the oxidation of carbon monoxide to carbon dioxide with the help of a platinum catalyst:

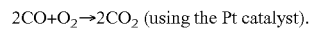

$2CO+O_2 \rightarrow 2CO_2$ (using the Pt catalyst).

The product obtained by the chemical reaction, namely $CO_2$ in the above example, leaves the microfluidic channel through the outlet 32. The path of flow of the reactant/product is illustrated in FIG. 1 by the arrow 40 arranged in the microfluidic channel.

Since many reactions are optimized at a certain temperature level (in the preceding example, the platinum catalyst requires an initiation temperature of 250° C.), a heating element 16, 26 may be arranged in the second layer 12, 22 of the substrates 10, 20. The respective heating element 16, 26 may be connected to the voltage source by vias 17, 27. The heating element 16, 26, which is preferably designed in a meandering arrangement, can be manufactured by a thick-film technique in the second layer 12, 22 by the traditional LTCC method. Then the vias 17, 27 are introduced into the second layer 12, 22 and are connected to the voltage source (not shown) and the respective heating element 16, 26.

Figure 2:
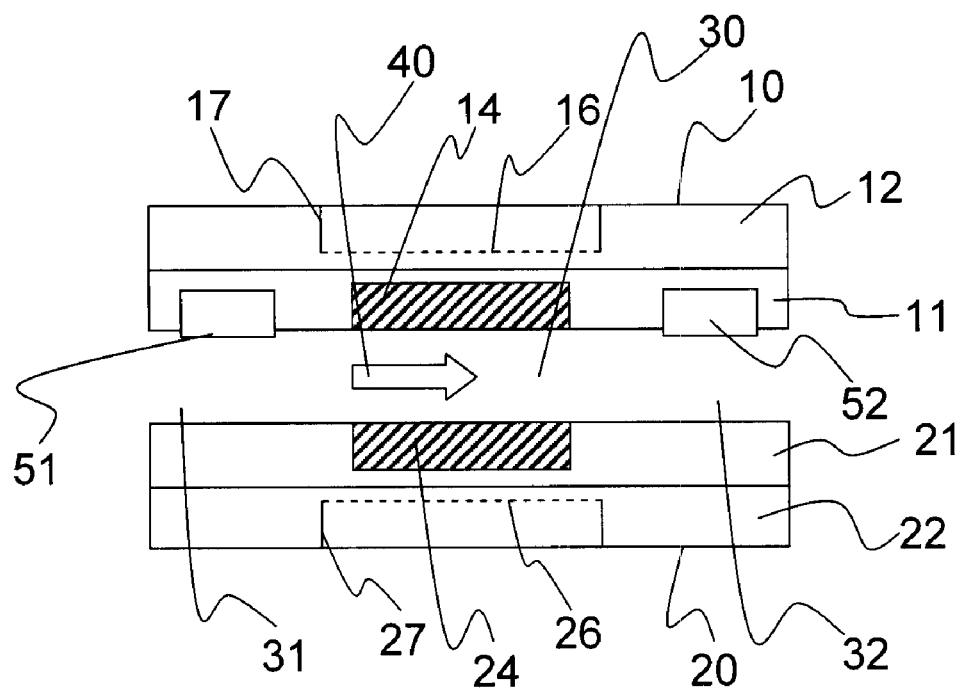

In comparison with the exemplary embodiment shown in FIG. 1, the exemplary embodiment shown in FIG. 2 additionally contains a sensor element 51 in the area of the inlet 31, with the sensor element (for example) measuring the velocity of flow of the incoming reactant. The sensor element 51 is arranged in the first layer 11 of the first substrate 10. Alternatively, the sensor element may also be provided in the first layer 21 of the second substrate 20 or one sensor element may be provided in each of the two substrates 10, 20.

Furthermore, a sensor element 52 which is provided in the exemplary embodiment shown in FIG. 2 is arranged in the area of the outlet 32 in the first layer 11 of the first substrate 10. This sensor element determines, for example, the quality of the conversion process, i.e., the $CO_2$ concentration, for example, in the volume flow emerging from the microchannel. By analogy with the sensor element 51, the sensor element 52 may also be provided in the first layer 21 of the second substrate 20 or in both substrates 10, 20.

Figure 3:
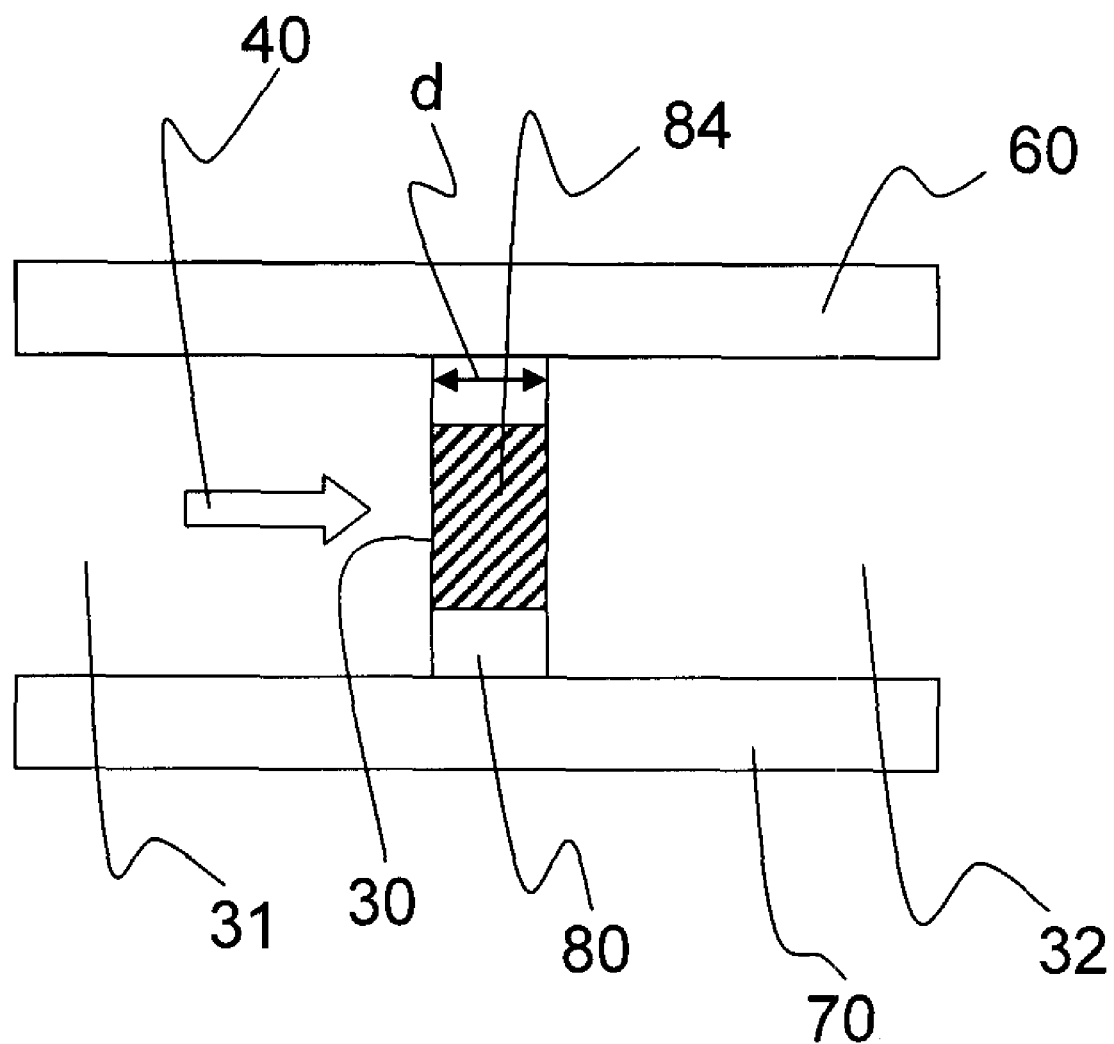

In the third exemplary embodiment of an inventive microreactor shown in FIG. 3, the flow path of the reactant/product is formed by a first wall 60 and a second wall 70 between inlet 31 and outlet 32. The walls 60, 70 may be made of a ceramic material, for example. A substrate membrane 80 is arranged in the area of the reaction space 30, which is provided between inlet 31 and outlet 32, this substrate membrane 80 being constructed of only one layer and having a porosized area 84. As arrow 40 shows, indicating the direction of flow of the reactant/product and/or the reactants/products, the porosized membrane 80 is arranged perpendicular to the direction of flow, so the entire media flow of the reactant(s) is forced to pass through the membrane 80 with porosized area 84. The membrane 80 is porosized here over its entire thickness d (thickness d corresponds to the extent of membrane 80 in the direction of flow) and is then coated with a catalytically active material.

The advantage of the third exemplary embodiment of a microreactor as described above is the increased conversion rate. However, due to the passage of the total media flow through the membrane 80, a comparatively significant throttling of the system is achieved.

What is claimed is:

1. A microreactor having:
   a. a substrate (10, 20, 80) having a first layer (11, 21, 80) of a first ceramic material, the first layer (11, 21, 80) containing
      (1) at least one first component of a crystalline ceramic material and/or a glass material, the first component defining a matrix, and
      (2) a second component of an additional crystalline ceramic material situated in the matrix, the second component including crystals and/or crystal agglomerates,
   b. a cavity structure (14, 24, 84) defined by removal of at least some of the surface areas of the crystals and/or crystal agglomerates of the second component in the first layer (11, 21, 80);
   c. at least one catalytically active material arranged in and/or on the cavity structure (14, 24, 84).

2. The microreactor of claim 1 wherein the cavity structure (14, 24, 84) is defined by a porous or tunnel structure.

3. The microreactor of claim 1 wherein the at least one catalytically active material contains at least one element or one compound selected from the group of platinum, palladium, nickel and rhodium.

4. The microreactor of claim 1 wherein the second component:
   a. contains one or more of:
      (1) Al2O3 crystallites,
      (2) an aluminum-based crystalline compound, and
      (3) an aluminum oxide-based crystalline compound, with a total amount of at most 40 vol % in the matrix, and
   b. contains silicon and/or lead in the surface areas of the crystals and/or crystal agglomerates.

5. The microreactor of claim 1 wherein a heating element (16, 26) is situated adjacent the cavity structure (14, 24, 84) provided in the first layer (11, 21, 80).

6. The microreactor of claim 1 wherein:
   a. the substrate (10, 20) and the cavity structure (14, 24) form at least a section of a wall of a reaction space (30) of the microreactor, wherein the conversion of at least one reactant into at least one product may occur,
   a. the area having the cavity structure (14, 24) is situated such that the at least one reactant may flow past the area having the cavity structure (14, 24).

7. The microreactor of claim 1 wherein the cavity structure (84):
   a. extends over the entire thickness (d) of the substrate (80) in a predetermined area, and
   b. is situated within a flow passage (31, 32) such that all flow through the flow passage must go through the cavity structure (84).

8. The microreactor of claim 1 wherein:
   a. the cavity structure (14, 24, 84) is situated adjacent a reaction space (30) defined in the microreactor, and
   b. a sensor element (51) is situated in the reaction space (30), wherein the sensor element (51) measures the velocity of flow within the reaction space (30).

9. The microreactor of claim 1 wherein:
   a. the cavity structure (14, 24, 84) is situated adjacent a reaction space (30) defined in the microreactor, and
   b. a sensor element (51) is situated in the reaction space (30), wherein the sensor element (51) is a chemical sensor for measuring a quality of a reaction within the reaction space (30).

10. A method for manufacturing a microreactor, the method including the steps of:
    a. providing a substrate (10, 20, 80) having a first layer (11, 21, 80) of a first ceramic material, the first layer (11, 21, 80) containing
       (1) at least one first component of a crystalline ceramic material and/or a glass material, the first component defining a matrix, and
       (2) a second component of an additional crystalline ceramic material situated in the matrix, the second component including crystals and/or crystal agglomerates,
    b. removing at least some of the surface areas of the crystals and/or crystal agglomerates of the second component to create a cavity structure (14, 24, 84) in the first layer (11, 21, 80);
    c. providing at least one catalytically active material arranged in and/or on the cavity structure (14, 24, 84).

11. The method of claim 10 wherein the surface areas of the crystals and/or crystal agglomerates of the second component are removed by etching.

12. The method of claim 11 wherein the step of removing the surface areas by etching includes:
    a. situating a mask upon the first layer (11, 21, 80), the mask exposing an area of the first layer;
    b. removing the exposed area to create the cavity structure (14, 24, 84) in the first layer (11, 21, 80) at the exposed area.

13. The method of claim 11 wherein the step of removing the surface areas by etching includes exposing the surface areas to a wet chemical.

14. The method of claim 13 wherein the wet chemical includes phosphoric acid.

15. The method of claim 10 wherein the cavity structure (14, 24, 84) is formed by etching away a transitional phase or an intermediate phase of the crystals and/or crystal agglomerates of the second component.

16. The method of claim 10 wherein the catalytically active material is provided in and/or on the cavity structure (14, 24, 84) by vapor phase deposition.

17. The method of claim 10 wherein the cavity structure (14, 24, 84) is defined by a porous or tunnel structure.

18. The method of claim 10 wherein the second component includes one or more of:

a. Al2O3 crystallites,
b. an aluminum-based crystalline compound, and
c. an aluminum oxide-based crystalline compound.

19. The method of claim 10 further including the step of forming at least two layers (11, 12, 21, 22) within the substrate by LTCC manufacturing prior to creating the cavity structure (14, 24) in the first layer (11, 21).

20. The method of claim 10 further including the step of mounting a heating element (16, 26) adjacent the cavity structure (14, 24, 84).

21. The method of claim 20 wherein the step of mounting a heating element (16, 26) adjacent the cavity structure (14, 24, 84) includes:
  a. forming a second layer (12, 22) adjacent the first layer (11, 21) by LTCC manufacturing;
  b. situating the heating element (16, 26) in the second layer (12, 22);
  c. introducing vias (17, 27) connecting the heating element (16, 26) to a voltage source.

22. The method of claim 10 wherein:
  a. the substrate (80) includes no layers adjacent the first layer (80), and
  b. the step of removing at least some of the surface areas includes etching a portion of the surface areas over the entire thickness (d) of the first layer (80), whereby the cavity structure (84) extends through the entire thickness (d) of the substrate (80).

23. The method of claim 10 further including the steps of:
  a. mounting a sensor element (51) in or on the substrate (10, 20, 80), wherein the sensor element (51) measures flow velocity, and
  b flowing fluid across the substrate (10, 20, 80) and the cavity structure (14, 24, 84), wherein the sensor element (51) is upstream from the cavity structure (14, 24, 84).

24. The method of claim 10 further including the steps of:
  a. mounting a sensor element (51) in or on the substrate (10, 20, 80), wherein the sensor element (51) is a chemical sensor for measuring a quality of a reaction, and
  b flowing fluid across the substrate (10, 20, 80) and the cavity structure (14, 24, 84), wherein the sensor element (51) is downstream from the cavity structure (14, 24, 84).

25. The method of claim 10 further including the steps of:
  a. forming a reaction space (30) wherein the substrate (10, 20) forms at least a portion of a wall of the reaction space (30), with the cavity structure (14, 24) adjacent the reaction space (30);
  b. flowing fluid through the reaction space (30) adjacent the cavity structure (14, 24).

26. The method of claim 10 further including the step of flowing fluid through the cavity structure (14, 24) between opposite sides of the substrate (80).

27. A method for manufacturing a microreactor, the method including the steps of:
  a. providing a substrate (10, 20, 80) having a first layer (11, 21, 80) containing
    (1) a first component defining a matrix, and
    (2) a second component interspersed within the matrix, the second component being different from the first component;
  b. etching away at least a portion of the second component to create a cavity structure (14, 24, 84) in the first layer (11, 21, 80), the cavity structure (14, 24, 84) defining pores and/or tunnels within the matrix;
  c. coating surfaces of the cavity structure (14, 24, 84) with at least one catalytically active material;
  d. flowing reacting fluid adjacent and/or through the cavity structure (14, 24, 84).

28. The method of claim 27 wherein the step of coating surfaces of the cavity structure (14, 24, 84) includes applying the at least one catalytically active material to the surfaces via vapor deposition.

29. The method of claim 27 further including the step of forming a second layer (12, 22) adjacent the first layer (11, 21, 80) via LTCC manufacturing, wherein the second layer (12, 22) includes a circuit formed therein, the circuit including a heating element (16, 26) situated adjacent the cavity structure (14, 24, 84).

30. The method of claim 27 further including the steps of:
  a. situating at least one of a velocity sensor (51) and a chemical sensor (51) adjacent the cavity structure (14, 24, 84); and
  b. obtaining sensor measurements from the flowing reacting fluid.

31. A microreactor having:
  a. a substrate containing:
    (1) a matrix defined by a first component, the first component being at least primarily composed of one or more of:
      i. a crystalline ceramic material,
      ii. a glass material;
    (2) a second component distributed through the matrix, the second component being at least primarily composed of crystalline ceramic material,
  b. a cavity structure situated within the matrix, the cavity structure being defined by removal of at least some of the surface areas of the crystals of the second component from the matrix adjacent a surface of the substrate, thereby defining a porous region into which fluid can enter from the surface of the substrate;
  c. a catalytically active material situated within the cavity structure.

32. The microreactor of claim 31 wherein the second component:
  a. defines no more than 40% of the volume of the substrate; and
  b. contains:
    (1) aluminum, and
    (2) silicon and/or lead in the surface areas of the crystals of the second component.

33. The microreactor of claim 31 wherein the catalytically active material contains one or more of:
  a. platinum,
  b. palladium,
  c. nickel, and
  d. rhodium.

34. The microreactor of claim 31 further including a fluid flow passage defined in the microreactor, wherein the surface of the substrate bearing the cavity structure therein bounds at least a portion of the fluid flow passage.

35. The microreactor of claim 31 further including a fluid flow passage defined in the microreactor, wherein the cavity structure is situated between opposing ends of the fluid flow passage such that all fluid flow between the opposing ends must pass through the cavity structure.

* * * * *